(12) United States Patent
Stortz et al.

(10) Patent No.: US 6,691,003 B1
(45) Date of Patent: Feb. 10, 2004

(54) METHOD AND DEVICE FOR IDENTIFYING THE STATE OF A SYSTEM FOR EFFECTING THE AUTOMATIC LONGITUDINAL AND/OR LATERAL CONTROL OF A MOTOR VEHICLE

(75) Inventors: Christiane Stortz, Schutterwald (DE); Klaus Winter, Schwieberdingen (DE); Klaus Lehre, Malsch (DE); Reiner Marchthaler, Gingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/088,850

(22) PCT Filed: Sep. 21, 2000

(86) PCT No.: PCT/DE00/03287

§ 371 (c)(1),
(2), (4) Date: Feb. 10, 2003

(87) PCT Pub. No.: WO01/22114

PCT Pub. Date: Mar. 29, 2001

(30) Foreign Application Priority Data

Sep. 21, 1999  (DE) ......................................... 199 45 268

(51) Int. Cl.[7] ............................................... G06F 7/00
(52) U.S. Cl. ......................................................... 701/1
(58) Field of Search ............................... 701/1, 301, 45; 280/728, 734, 735

(56) References Cited

U.S. PATENT DOCUMENTS

| | | | | |
|---|---|---|---|---|
| 5,742,916 A | * | 4/1998 | Bischoff et al. | ............... 701/45 |
| 5,809,439 A | * | 9/1998 | Damisch | ...................... 701/45 |
| 5,839,096 A | | 11/1998 | Lyons et al. | |

FOREIGN PATENT DOCUMENTS

| | | |
|---|---|---|
| DE | 196 44 164 | 4/1998 |
| DE | 198 32 800 | 2/1999 |
| DE | 199 29 794 | 1/2000 |
| EP | 1 026 514 | 8/2000 |

\* cited by examiner

*Primary Examiner*—Yonel Beaulieu
(74) *Attorney, Agent, or Firm*—Kenyon & Kenyon

(57) ABSTRACT

Method and device for state estimation in a system for automatic longitudinal and/or transverse regulation in a motor vehicle, operating according to the radar principle and/or the lidar principle, in particular for detecting soiling and/or blindness of a sensor is disclosed. The state estimation is dependent upon at least two indicators, which are formed from the signals received and/or transmitted by the sensor.

15 Claims, 3 Drawing Sheets

METHOD AND DEVICE FOR IDENTIFYING THE STATE OF A SYSTEM FOR EFFECTING THE AUTOMATIC LONGITUDINAL AND/OR LATERAL CONTROL OF A MOTOR VEHICLE

FIELD OF THE INVENTION

The present invention relates to a method and a device for state estimation in a system for automatic longitudinal and/or transverse regulation in a motor vehicle. Such systems are used, for example, as part of an automatic cruise control in a vehicle for detection of vehicles driving ahead. In these systems (e.g., adaptive cruise control), the traditional cruise control is supplemented by a distance sensor, so it is possible to automatically adjust the speed and/or distance to the traffic situation ahead of the vehicle. To guarantee reliable use in such a system, the function of the system is usually monitored.

BACKGROUND INFORMATION

German Patent Application 196 44 164 A1 describes a motor vehicle radar system in which a dielectric body is positioned in the path of the beam of the electromagnetic waves for protection against weather effects and preferably also for focusing. To detect and possibly eliminate dirt and coatings of ice, snow or moisture deposited on this dielectric body, the dielectric body has an arrangement of electric conductors. With these conductors, the dielectric body may be heated, the attenuation caused by a possible coating may be measured and a target simulation may be performed for function testing of the radar system. To measure a coating of ice, snow or moisture with this automotive radar system, the dielectric body is covered by two chamber-like arrangements that are tightly interleaved with one another without coming in contact. Each of the chamber-like arrangements is a separate, electrically connected structure. A resistance R and a capacitance C may be measured between these two interleaved arrangements. These values depend on the loss angle tan δ of the material between the two arrangements and thus also on loss angle tan δ of any coating that may be present. In this way, it is possible to determine the signal attenuation caused by a coating and thus the degree of soiling. To perform this measurement of the coating, the electrically conducting arrangement must be applied to the outside of the dielectric body.

SUMMARY OF THE INVENTION

An object of the present invention is to provide a method and a device for state estimation in a system for automatic longitudinal and/or transverse regulation in a motor vehicle, so that soiling and/or blindness of a sensor will be determined reliably, rapidly, inexpensively and preferably without additional hardware components.

According to the present invention, this object is achieved by the fact that in a method for state estimation in a system for automatic longitudinal and/or transverse regulation in a motor vehicle, operating according to the radar principle and/or the lidar principle, in particular for detecting soiling and/or blindness of a sensor, the state estimation relies on at least two indicators ($I_n$) formed from the signals received and/or transmitted by the sensor.

This implementation offers the advantage that it does not require any additional hardware components, in particular no additional electric conductors on the outside of the sensor, for detection of soiling and/or blindness of a sensor. This is an inexpensive implementation of the method according to the present invention. Instead, the object is achieved via at least two indicators ($I_n$) formed directly from the signals received and/or transmitted by the sensor. Thus, rapid and reliable detection of soiling and/or blindness of a sensor is possible directly when the system having the sensor is put in operation and a few measurements have been performed, yielding analyzable results.

The at least two indicators ($I_n$) are preferably weighted with weighting factors ($a_n$). This offers the advantage that the indicators are weighted according to their different importance for the state of the system.

It is particularly advantageous to link the weighted indicators together. This offers the advantage of forming a linked indicator which has a greater relevance with regard to the stated object than an individual indicator ($I_n$).

For the transparency and comparability of the resulting data, it is advantageous for the sum of the weighting factors ($a_n$) to be no greater than 1.

It is particularly advantageous that the weighting factors ($a_n$) depend on at least one driving situation ($F_n$) and/or one probability ($V_n$) which is to be determined. This offers the advantage that the method according to the present invention may be adapted flexibly to various driving situations ($F_n$) and/or to probabilities ($V_n$) that are to be determined. It is advantageous here to take into account at least one of the following driving situations ($F_n$) in determination of the state (P) of the system:

1. The system detects another motor vehicle which is used as the target object for regulation.
2. The system does not detect any possible target object, but the system does detect other moving objects.
3. The system does not detect either a possible target object or any other moving objects.

By taking into account at least one of the aforementioned driving situations ($F_n$), it is possible to classify the driving situations ($F_n$) as they are typically differentiated by a system of the generic type.

As probabilities ($V_n$) to be determined, at least one of the following probabilities ($V_n$) is selected in the method according to the present invention:

1. The performance of the system is optimal.
2. The performance of the system is not optimal.
3. No functioning of the system is possible.

By determining at least one of the aforementioned probabilities ($V_n$), a probability ($V_n$) which unambiguously describes the state (P) of the system is advantageously determined.

Consequently, it is especially advantageous that the linked indicators yield at least one probability ($V_n$) which makes a statement regarding the probable state (P) of the system. The method is advantageously set up in such a way that the greatest of the probabilities ($V_n$) describes the state (P) of the system. This yields a state (P) of the system which supplies information regarding the probable state (P) of the system in a single quantity.

It is also advantageous that, as part of the method according to the present invention, the indicators ($I_n$) are normalized so that the possible value varies in a range between 0 and 1. This offers the advantage that all the indicators ($I_n$) are within one and the same value range, thus facilitating a comparison or an evaluation of the individual indicators ($I_n$). In particular in conjunction with the aforementioned interpretation of the weighting factors ($a_n$) such that the sum of the weighting factors ($a_n$) is no greater than 1, this offers the possibility that the resulting probabilities will also vary in a possible value range between 0 and 1 and will thus directly indicate a probability ($V_n$) of the system.

It is particularly advantageous that at least one of the following indicators ($I_n$) is used in the method according to the present invention:
1. The average angle quality of all objects detected by the system, which permits a statement regarding the quality of the object angle determined.
2. The object stability, which describes the rate of detection failures of the target or control object selected for the vehicle's longitudinal regulation.
3. The average power of the signals received by the sensor.
4. The sum of all objects detected by the system during a measurement.
5. The linkage of the distance and amplitude of the object detected at the greatest distance.
6. The road surface reflection detected by the system.

The indicators ($I_n$) listed above offer the advantage that they have different degrees of prominence depending on different driving situations ($F_n$). In this way it is possible to make a statement regarding the probable state (P) of the system in almost any driving situation ($F_n$).

In addition, in the method according to the present invention, it has proven advantageous that a state (P) is assumed to be determined only when the result of the linked indicators is obtained for a predetermined period of time (T). This offers the advantage that short-term changes in probabilities ($V_n$) due to external influences, for example, do not have a direct effect on the state (P), which is assumed to be determined.

It is advantageous that there are transition states between the probabilities ($V_n$) and these transition states are also used for analysis. For the case when there is a transition state between two probabilities ($V_n$), the resulting data may also be used for analysis.

It is a particular advantage of the method according to the present invention that the state (P) of the system thus determined is sent to a control unit which in turns controls a cleaning device for the sensor. This cleaning device is preferably at least a device that works with water, a mechanical cleaning device or a heater for the sensor. This influence on the control of a cleaning device for the sensor offers the advantage that cleaning of the sensor is optimized. In this way, the cleaning device for the sensor may be controlled, for example, in cases in which the control unit would not otherwise have triggered the cleaning device for the sensor.

DETAILED DESCRIPTION

Figure 1:
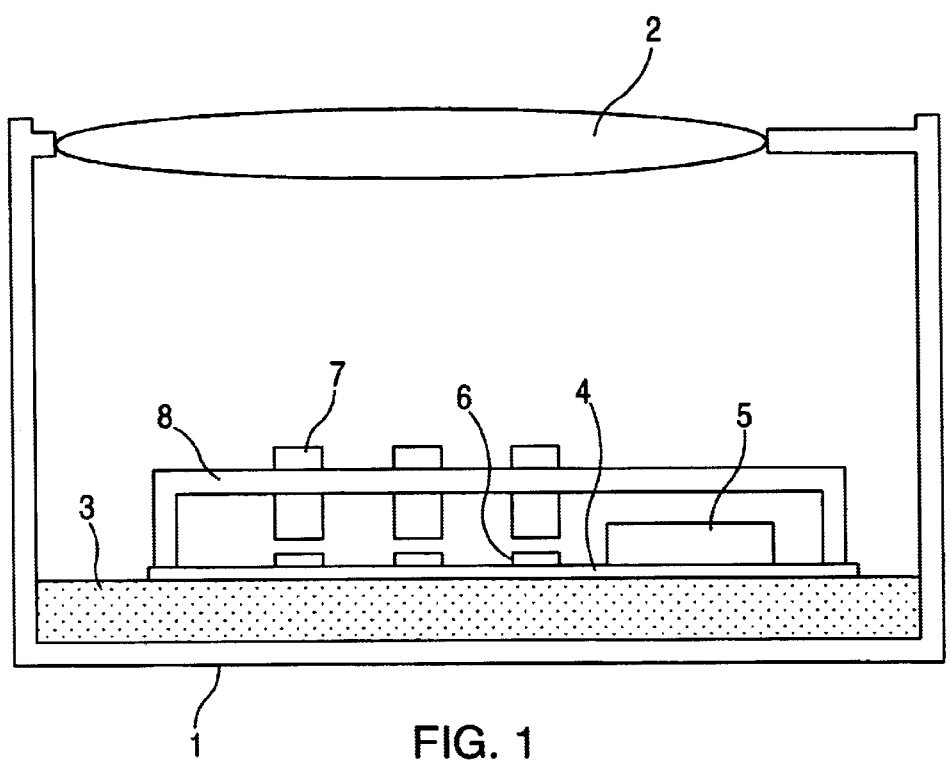
FIG. 1 shows an automotive radar system into which the method according to the present invention is integrated.

FIG. 1 shows an automotive radar system having a housing 1 and a focusing means 2, which may be, for example, a dielectric lens. Housing 1 contains a base plate 3 on which is situated a printed circuit board 4. On printed circuit board 4 are mounted electronic components 5, including the device according to the present invention for state estimation in a system for automatic longitudinal and/or transverse regulation in a motor vehicle.

Radiating elements 6, which may be designed as patch antenna elements 6, for example, are also mounted on circuit board 4. High-frequency microwave radiation is transmitted and/or received over these radiating elements 6. This radiation is prefocused by prefocusing means 7 before being finally focused by focusing means 2. In the direction of reception, the sequence is reversed accordingly. Prefocusing means 7 are held in position above radiating elements 6 by a cover 8.

It is also within the scope of the method according to the present invention that this method is employed in a radar system of any type, which is based on electromagnetic microwave radiation and/or based on the lidar principle.

Figure 2:
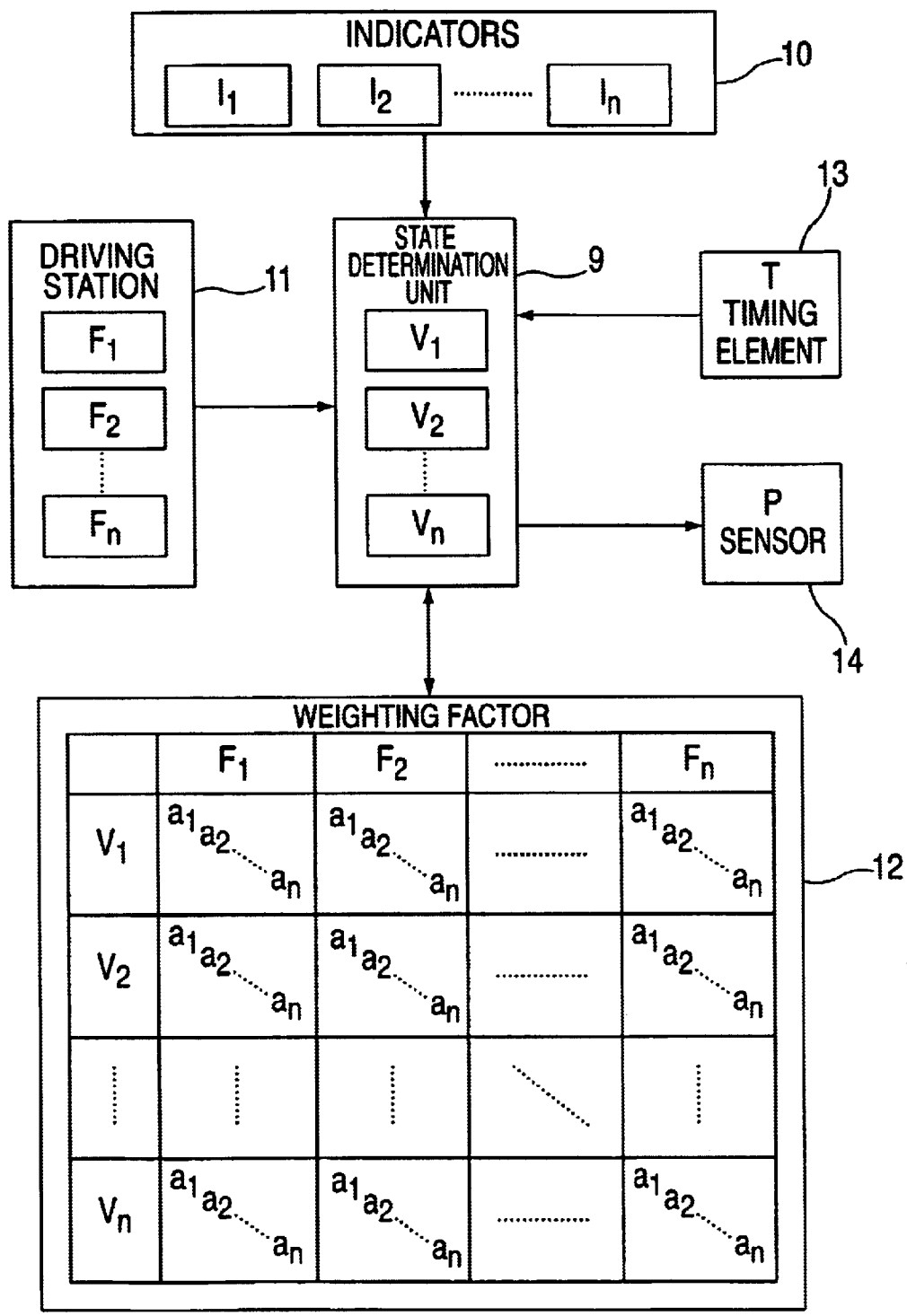
FIG. 2 shows a schematic diagram of the sequence of the method according to the present invention.

FIG. 2 shows a schematic diagram of the sequence in the method according to the present invention. In a state determination unit 9, probabilities ($V_n$) are determined in general case n.

The probabilities ($V_n$) to be determined are used to determine the probable state (P) of the system.

In the context of this embodiment, the following may be used, for example, as probabilities ($V_n$) to be determined, the greatest then being determined as possible state (P) of the system, for example:
1. The performance of the system is optimal ($V_1$). This may indicate, for example, that the sensor of the system is free of any soiling.
2. The performance of the system is not optimal ($V_2$). This may mean, for example, that the sensor of the system is soiled.
3. No functioning of the system is possible ($V_3$). This may mean, for example, that the sensor of the system is blind.

This definition of the probabilities ($V_n$) to be determined corresponds to the embodiment presented here. It is of course also possible to expand or further restrict the number of probabilities ($V_n$) to be determined. This depends primarily on the purpose for which the state signal (P) thus determined is to be used further on, and whether a qualitative result (function/no function) or a quantitative result (exact state value) is to be obtained.

Indicators ($I_n$) 10 are made available to state determination unit 9 for determination of the probabilities ($V_n$), as discussed in greater detail below. In this embodiment, the number of indicators ($I_n$) is generally assumed to be n. An instantaneous driving situation/driving state ($F_n$) 11 is transmitted to state determination unit 9. In this embodiment, n different driving situations ($F_n$) are indicated in general. The possible driving situations ($F_n$) will also be discussed in greater detail below. Depending on which probability ($V_n$) is to be determined at a given time in state determination unit 9, and depending on the prevailing driving situation ($F_n$) 11, the corresponding weighting factors ($a_1$ through $a_n$) are selected from a weighting factor table 12. This weighting factor table 12 contains the respective, suitably adapted weighting factors ($a_1$ through $a_n$) for each possible combination of probability ($V_n$) and possible driving situation ($F_n$) to be determined. The corresponding selected weighting factors ($a_1$ through $a_n$) are multiplied by the corresponding indicators ($I_n$) in state determination unit 9. The indicators weighted in this way are added up in state determination unit 9, yielding the probability ($V_n$) to be determined. In general, for linking the indicators ($I_n$) and the weighting factors ($a_1$ trough $a_n$), any desired form of linkage which yields a relevant result is possible. This procedure is repeated for each probability ($V_n$) to be determined. Due to the fact that both the indicators and the weighting factors ($a_n$) are normalized to a value range between 0 and 1, this yields on the whole probabilities ($V_n$) which are also in the value range between 0 and 1. In the case of the indicators ($I_n$), a value of 0 denotes complete soiling/blindness of the sensor and 1 denotes no soiling of the sensor. In the case of the probabilities ($V_n$) to be determined, 1 denotes that the sensor is 100% free and 0 denotes that the sensor is 0% free. After all probabilities ($V_n$) to be determined have been determined by state determination unit 9, the probability ($V_n$) which is the greatest is selected. In particular when the probability ($V_n$) determined in this way signals a poor state (P) of the system, a check is performed using a timing element 13 to determine whether the probability determined is the greatest of the probabilities ($V_n$) to be determined at least for a period of time (T) according to timing element 13. If this is the case, i.e., one of the probabilities ($V_n$) to be determined was the greatest of the probabilities ($V_n$) to be determined for at least a period of time (T), then this probability ($V_n$) is selected as the probable state (P) of the system and is made available as a state (P) of sensor 14 for further processing.

The advantage in using weighting factors ($a_n$) in particular is that it is possible to adapt to almost any possible driving situation ($F_n$) and/or probability ($V_n$) to be determined. The number of weighting factors to be stored in the table depends on the number of different driving situations, the number of different probabilities to be determined and the number of indicators used. In the simplest case of two driving situations, one probability to be determined, and two indicators, a total of 2×1×2=4 weighting factors are thus needed. In a more complicated embodiment having, for example, three driving situations, three probabilities to be determined, and six indicators, a total of 3×3×6=54 weighting factors would be necessary. The choice of the combination used will depend on many factors, such as, the sensor system used or the required accuracy and versatility, and this is up to the judgment of those skilled in the art.

The driving situations ($F_n$) mentioned above should be adapted to the available sensor system. Depending on how sensitive the sensor is and how many and which driving situations ($F_n$) are to be differentiable with the sensor, the driving situations to be taken into account should be determined. The most important driving situation to be taken into account in any case is when the system detects a different vehicle, which is selected as the control object for a longitudinal and/or transverse regulation. It is relevant to take into account this driving situation ($F_n$) because a system for automatic longitudinal and/or transverse regulation in a motor vehicle in the mode in which it has selected a target object for regulation will usually supply the most reliable and most accurate data. Another driving situation ($F_n$) to be taken into account is the driving situation ($F_n$) in which the system does not detect any possible object for regulation but does detect other moving objects/target objects. These may be, for example, vehicles coming from the opposite direction, moving objects at the edge of the road or vehicles/target objects ahead of the regulated vehicle but not selected as the regulation object (because, for example, they are traveling in a different lane). In addition, a driving situation ($F_n$) in which the system does not detect a possible target object for regulation or any other moving objects/target objects is also possible. Within the scope of the present invention, all driving situations ($F_n$) which may be differentiated by the system are also conceivable.

One of the most important points with regard to the reliability of the method according to the present invention is the selection of the indicators ($I_n$) used, which together with the weighting factors ($a_n$) represent the calculation basis of the method. As part of this embodiment, the following six possible indicators ($I_n$) will now be presented. However, other indicators ($I_n$) which may be formed from the signals received or sent out by the sensor are also conceivable. The most important criterion of such an indicator ($I_n$) is that it changes at least as a function of the state (P) of the sensor.

A first possible indicator ($I_n$) is the average angle quality of all objects detected by the system. The angle quality may be determined, for example, from the quotient of the real object angle and the difference between the real object angle and the measured object angle. To obtain a relevant indicator ($I_n$) which provides information regarding the quality of the object angle determined, the angle quality of all detected objects is determined. To be able to make this indicator ($I_n$) comparable or linkable to the other indicators ($I_n$) which follow, the indicator ($I_n$) is normalized to a value range between 0 and 1. In the case of a radar system based on electromagnetic microwave radiation, it is advisable to consider the angle qualities only in a range in which high qualities are generally expected. This is an angle range of approx. ±3°, for example, with a radar system for automatic cruise control and distance regulation. If the average angle quality then breaks down in this angle range, soiling and/or blindness of the sensor system may be assumed with a high probability. If the sensor system does not detect any object, e.g., because of total blindness and/or absolute free passage, then this indicator ($I_n$) becomes less important. The different degrees of importance of the indicators ($I_n$) is achieved in the method according to the present invention by weighting factors ($a_n$) adapted to the corresponding driving situation ($F_n$). In this way, the indicators having a high relevance specifically in the given driving situation ($F_n$) will be weighted more heavily in the method according to the present invention in any driving situation ($F_n$). In the case of the present indicator ($I_n$) of average angle quality of all objects detected by the system, this would be, for example, the driving situation ($F_n$) in which the system has selected a vehicle/target object in front of the regulated vehicle as the object for regulation (regulated following).

Another possible indicator ($I_n$) is the object stability, which describes the rate of detection failures of the target object or regulation object selected for the vehicle longitudinal regulation. For example, if a system for automatic cruise control and distance regulation in a motor vehicle has selected a vehicle traveling ahead of it as the regulation object, then tracking is implemented. In this tracking, the data determined by the sensor system in each time interval is compared with that detected in the previous time intervals. In this manner, a type of virtual track may be stored in the memory of the system for each object detected. It usually occurs here that even the selected regulation object is not detected in each time interval. This results in detection gaps in the virtual track. The object stability may then be determined from the quotient of the number of time intervals in which an object has been detected and the total number of time intervals in which the object has been observed. This indicator ($I_n$) is also normalized to a value range between 0 and 1 to make it comparable to the other indicators. If this indicator ($I_n$) is filtered, normalized and considered over a longer period of time, it is very sensitive to an altered system state, in particular when there is a regulation object traveling ahead of the regulated vehicle, or when a target object has been selected for regulation; this is because, in general, a very high object stability is expected in this driving situation ($F_n$). Precisely this situation in which one's own vehicle is traveling behind a regulation object traveling ahead is one of the situations in which the state (P) of the system is often greatly impaired. This may occur, for example, due to the fact that dirt, snow or slush is thrown up by the regulation object traveling ahead, soiling the sensor of one's own system for automatic cruise control and/or distance regulation. For this reason, the indicator "object stability" is weighted very highly, in particular in a driving situation ($F_n$) in which a target object is used for regulation.

Another possible indicator ($I_n$) is the average power of the signals received by the sensor. If a high-power signal is received by a sensor, this may originate, for example, from individual strong targets or from multiple weak targets. However, if there are no targets or if the sensor is soiled or has been blinded, then a low power level is received by the sensor. For the calculation of the indicator ($I_n$), the powers of all peaks detected in the spectrum of the received signals are added up and an average is formed. Following this, it is also advisable for this indicator ($I_n$) to be normalized to a value between 0 and 1 to permit a comparison with the other indicators ($I_n$). This indicator ($I_n$) is of great importance in particular when total blinding of the sensor is to be ascertained and in driving situations ($F_n$) in which no target object has been selected for regulation but other target objects have been detected. This indicator ($I_n$) is thus weighted especially heavily ($a_n$) in determination of the corresponding probabilities ($V_n$).

Another possible indicator ($I_n$) is the sum of all objects detected by the system during a measurement. Normalization in a value range between 0 and 1 is also advisable with this indicator ($I_n$). This indicator ($I_n$) has a high significance, in particular, in evaluation of the total blindness of the sensor and in driving situations ($F_n$) in which no target object has been detected for regulation but other target objects are being detected. This indicator ($I_n$) is thus weighted highly ($a_n$) accordingly in determination of the corresponding probabilities ($V_n$).

Another possible indicator ($I_n$) is the linkage of the distance and amplitude of the object detected at the greatest distance. In this case, the system first determines the distance and amplitude of the target object detected at the greatest distance. Then these two values are multiplied to obtain a quantity which is independent of the object geometry. After suitable normalization, preferably in a value range between 0 and 1, this indicator ($I_n$) provides information regarding the maximum range of the sensor and the signal strength of the detected targets in particular. If this indicator ($I_n$) drops below a certain limit value for a longer period of time, it may be deduced that the sensor is blind. If no target object is detected, this indicator ($I_n$) is set at 0. This indicator ($I_n$) is then weighted highly ($a_n$), in particular when no direct regulation object is detected but other target objects are detected.

Another possible indicator ($I_n$) is the road surface reflection detected by the system. In this case, it is possible for the sensor to detect road surface reflection over its vertical detection range. This indicator ($I_n$) may be used in particular for evaluation when there are no target and/or regulation objects. In these driving situations ($F_n$), this indicator ($I_n$) is accordingly weighted strongly ($a_n$). Since the road surface reflection detected by the system is usually detected only very weakly, soiling and/or blinding of the sensor may thus be detected very promptly. This may be ascertained by the fact that in the case of soiling and/or blinding, the weak signals of the road reflection detected by the system no longer appear in the spectrum of all detected signals. Again with this indicator ($I_n$), normalization in a value range between 0 and 1 is suggested to make it comparable to other indicators ($I_n$).

In general, all indicators ($I_n$) depend more or less on the environment structure. This fact must be taken into account in analysis of the corresponding signals in any case. However, to take this influence into account with other influences, it is within the scope of the present invention that the signals are filtered and/or subjected to some other signal processing in order to determine the indicators ($I_n$). The indicators ($I_n$) are preferably normalized to a value range between 0 and 1, but this may also be accomplished by some other method.

In general, the method presented here may be adapted to various vehicles and/or sensor systems and/or environment structures. To do so, the number of indicators ($I_n$) used may be increased or reduced, the type/selection of indicators ($I_n$) may be varied, the driving situation ($F_n$) to be differentiated may be varied, accordingly other probabilities ($V_n$) may be determined, different states (P) for the system may be determined accordingly for the various probabilities ($V_n$) determined and the weighting factors ($a_n$) may be adapted to the different driving situations ($F_n$) and the probabilities ($V_n$) to be determined. It is left up to the expertise of those skilled in the art here to adapt this method in a suitable manner.

Figure 3:
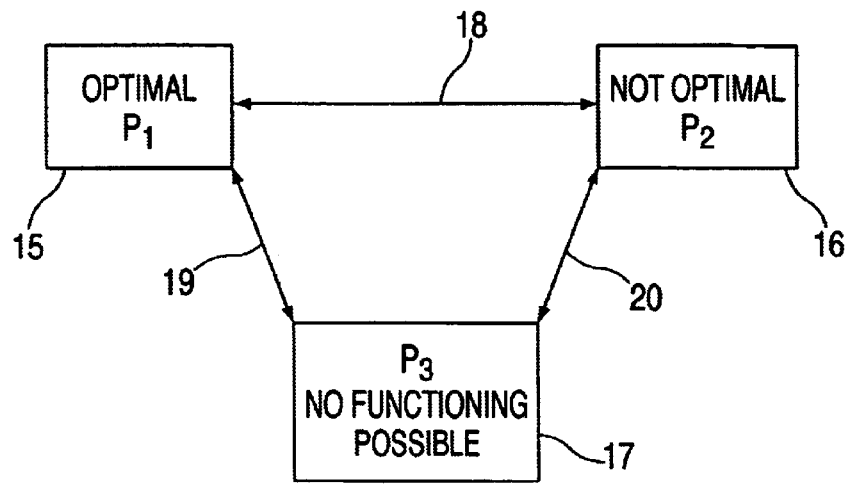
FIG. 3 shows an exemplary diagram of the resulting transitional states.

FIG. 3 illustrates possible transition states between states (P), where 15, 16 and 17 denote three possible states $P_1$, $P_2$ and $P_3$. Arrows 18, 19 and 20 denote three possible transition states between states $P_1$, $P_2$ and $P_3$. For example, if a state $P_1$ indicates that the performance of the system is optimal, state $P_2$ indicates that the performance of the system is not optimal, and state $P_3$ indicates that no functioning of the system is possible, then transition 18 may occur, for example, due to heavy snowfall which causes the sensor to become easily clogged. Transition 20 may occur, for example, due to the fact that one's own vehicle is driving in the snow drift of a vehicle driving in front of it. The sensor which was previously soiled may become further clogged to the point of blindness. Transition 19 may occur, for example, due to snow sludge being thrown onto the sensor at high speed when the sensor that was previously free becomes clogged immediately and directly. The prevailing driving situation ($F_n$) must always be taken into account within transition states 18, 19 and 20 because the usability of the individual indicators ($I_n$) and/or the transition states depends to a great extent on which situation prevails on the road or in the environment. It is within the context of the present invention to also include possible transition states in an analysis.

Figure 4:
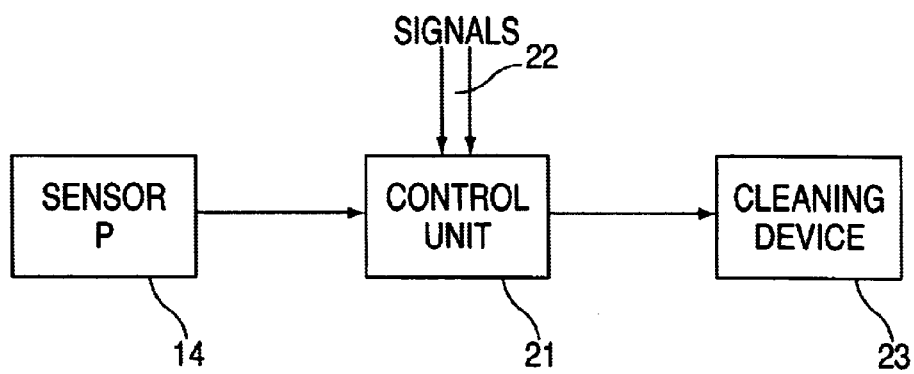
FIG. 4 shows a possible arrangement to cause the determined state (P) of the system to be sent to a control unit which in turn triggers a cleaning device for the sensor.

FIG. 4 shows a possibility of how the determined state (P) of the system may enter into a control which triggers a cleaning device 23 for the sensor. A previously determined state of sensor (P) 14 is relayed here to a control unit 21. In general, control unit 21 also receives other signals 22 which are necessary for controlling a cleaning device 23. Then a cleaning device 23 is triggered accordingly by control unit 21. Cleaning device 23 may be a device that works with water, a mechanical cleaning device or a heater for the sensor 14. In the case of a heater, it is usually such that the heating is activated below a certain temperature threshold. Because of certain weather and/or ambient situations, for example, it may happen that a soiled state (P) of the sensor 14 is determined but the ambient temperature is above the temperature threshold, and in this case the heater would not normally be triggered. Thus triggering of the heating may be performed in a timely manner due to the determined state (P) which indicates soiling of the sensor in order to counteract this soiling.

What is claimed is:

1. A method of state estimation in a system for performing at least one of automatic longitudinal regulation and transverse regulation in a motor vehicle, operating according to at least one of radar principle and lidar principle, for detecting at least one of soiling and blindness of a sensor, comprising the steps of:

forming at least two indicators, wherein the indicators are formed from at least one of signals received and transmitted by the sensor, and wherein the at least two indicators are weighted using weighting factors; and performing state estimation taking into account the at least two indicators.

2. The method of state estimation according to claim 1, wherein the weighted indicators are linked together.

3. The method of state estimation according to claim 1, wherein sum of the weighting factors is not greater than one.

4. The method of state estimation according to claim 1, wherein the weighting factors depend on at least one of a driving situation and a probability which is to be determined.

5. The method of state estimation according to claim 4, wherein the driving situation is at least one of:

(a) the system detects another vehicle, which is used as a target object for regulation;

(b) the system does not detect a possible target object, but the system detects other moving objects; and (c) the system does not detect a possible target object and any other moving object.

6. The method of state estimation according to claim 4, wherein at least one of the following probabilities is selected as the probability to be determined:

(a) performance of the system is optimal;

(b) performance of the system is not optimal; and (c) no functioning of the system is possible.

7. The method of state estimation according to claim 2, wherein the linked indicators yield at least one probability which provides information regarding a probable state of the system.

8. The method of state estimation according to claim 7, wherein the greatest of the probabilities describes the state of the system.

9. The method of state estimation according to claim 1, wherein the indicators are normalized, such that the possible value varies in a range between 0 and 1.

10. The method of state estimation according to claim 1, wherein at least one of the following indicators is used:

(a) average angle quality of all objects detected by the system, which provides information regarding quality of object angle determined;

(b) object stability, which describes rate of detection failures of at least one of target object and regulation object selected for the longitudinal regulation of the vehicle;

(c) average power of signals received by the sensor;

(d) sum of all objects detected by the system during a measurement;

(e) linkage of distance and amplitude of an object detected at the greatest distance; and (f) road surface reflection detected by the system.

11. The method of state estimation according to claim 7, wherein a state is assumed to be determined only when a result of the linked indicators is obtained for at least a predetermined period of time.

12. The method of state estimation according to claim 6, wherein the method further utilizes transition states existing among the probabilities and the states.

13. The method of state estimation according to claim 8, wherein the determined state of the system is entered into a control unit which triggers a cleaning device for the sensor.

14. The method of state estimation according to claim 13, wherein the cleaning device is at least one of a device which works with water, a mechanical cleaning device and a heater for the sensor.

15. A device for state estimation in a system for performing at least one of automatic longitudinal regulation and transverse regulation in a motor vehicle, operating according to at least one of the radar principle and the lidar principle, for the detection of at least one of soiling and blindness of a sensor, comprising:

means for forming at least two indicators from at least one of signals received and transmitted by the sensor;

means for weighting the at least two indicators using weighting factors; and means for performing the state estimation by taking into account the at least two indicators.

\* \* \* \* \*